United States Patent
Masen et al.

(10) Patent No.: US 11,313,484 B2
(45) Date of Patent: Apr. 26, 2022

(54) MULTIFUNCTION VALVE

(71) Applicant: MAXITROL COMPANY, Southfield, MI (US)

(72) Inventors: Mark Geoffrey Masen, Leonard, MI (US); Jason Sagovac, Dearborn Heights, MI (US)

(73) Assignee: Maxitrol Company, Southfield, MI (US)

( * ) Notice: Subject to any disclaimer, the term of this patent is extended or adjusted under 35 U.S.C. 154(b) by 178 days.

(21) Appl. No.: 16/539,683

(22) Filed: Aug. 13, 2019

(65) Prior Publication Data

US 2019/0368620 A1    Dec. 5, 2019

Related U.S. Application Data

(63) Continuation-in-part of application No. 16/419,615, filed on May 22, 2019, which is a continuation of
(Continued)

(51) Int. Cl.
*F16K 1/22* (2006.01)
*F16K 31/04* (2006.01)
(Continued)

(52) U.S. Cl.
CPC ............ *F16K 31/041* (2013.01); *F16K 1/222* (2013.01); *F16K 1/2261* (2013.01); *F16K 1/54* (2013.01)

(58) Field of Classification Search
CPC .... F16K 5/0407; F16K 5/0442; F16K 5/0684; F16K 5/12; F16K 5/0605; F16K 5/045;
(Continued)

(56) References Cited

U.S. PATENT DOCUMENTS 4,587,990 A    5/1986    Pennell et al.
10,302,204 B2    5/2019    Masen et al.
(Continued)

FOREIGN PATENT DOCUMENTS

CN    109595355 A    4/2019
FR    2125709 A5    9/1972
(Continued)

OTHER PUBLICATIONS

English language abstract and machine-assisted English translation for CN 109595355 extracted from espacenet.com database on Jan. 11, 2021, 8 pages.
(Continued)

*Primary Examiner* — Kelsey E Cary
(74) *Attorney, Agent, or Firm* — Howard & Howard Attorneys PLLC

(57) ABSTRACT

A multifunction valve includes a valve body defining an inlet, and outlet and an interior chamber. A flow control gate may be disposed within the interior chamber and comprises one or more protrusions configured to provide a high level of precision control of a fluid flow rate through the multifunction valve as the flow control gate is rotated through an arcuate range of positions. The protrusions may comprise a cut-out portion, wherein the size and/or shape of the cut-out may be configured to modify the fluid flow rate through the multifunction valve. A method of modulating a fluid flow rate includes directing fluid flow through a multifunction valve from an inlet to an outlet, the multifunction valve including a flow control gate, adjusting the flow rate through the multifunction valve by rotating a control shaft to position the flow control gate to variably occlude the outlet of the multifunction valve.

20 Claims, 12 Drawing Sheets

Related U.S. Application Data application No. 15/414,797, filed on Jan. 25, 2017, now Pat. No. 10,302,204.

(60) Provisional application No. 62/288,620, filed on Jan. 29, 2016.

(51) Int. Cl.
    *F16K 1/226*     (2006.01)
    *F16K 1/54*     (2006.01)

(58) Field of Classification Search
CPC ........ F16K 1/222; F16K 1/226; F16K 1/2261; F16K 1/22; F16K 1/18; F16K 1/20; F16K 1/2014; F16K 1/2015; F16K 31/041; F16K 1/54
See application file for complete search history.

(56) References Cited

U.S. PATENT DOCUMENTS

| | | |
|---|---|---|
| 2005/0012061 A1 | 1/2005 | Faye et al. |
| 2009/0309056 A1 | 12/2009 | Tsai |
| 2010/0213400 A1 | 8/2010 | Yli-Koski |
| 2016/0333795 A1* | 11/2016 | Pollock ............... F16K 11/0873 |
| 2017/0045146 A1* | 2/2017 | Morrison ................ F16K 1/222 |
| 2017/0067562 A1* | 3/2017 | Thiessen ................ F16K 1/222 |
| 2018/0313465 A1* | 11/2018 | Fages ..................... F16K 47/14 |
| 2019/0003601 A1* | 1/2019 | Court ........................ F16K 3/08 |
| 2019/0331229 A1* | 10/2019 | McMahon ............. B22F 10/30 |
| 2019/0331237 A1 | 10/2019 | Masen et al. |
| 2021/0003222 A1* | 1/2021 | Nasu ..................... F16K 1/2261 |

FOREIGN PATENT DOCUMENTS

| | | |
|---|---|---|
| FR | 2616874 A1 | 12/1988 |
| GB | 1215700 A | 12/1970 |
| WO | 2009048565 A1 | 4/2009 |

OTHER PUBLICATIONS

English language abstract and machine-assisted English translation for FR 2 616 874 extracted from espacenet.com database on Jan. 11, 2021, 5 pages.

\* cited by examiner

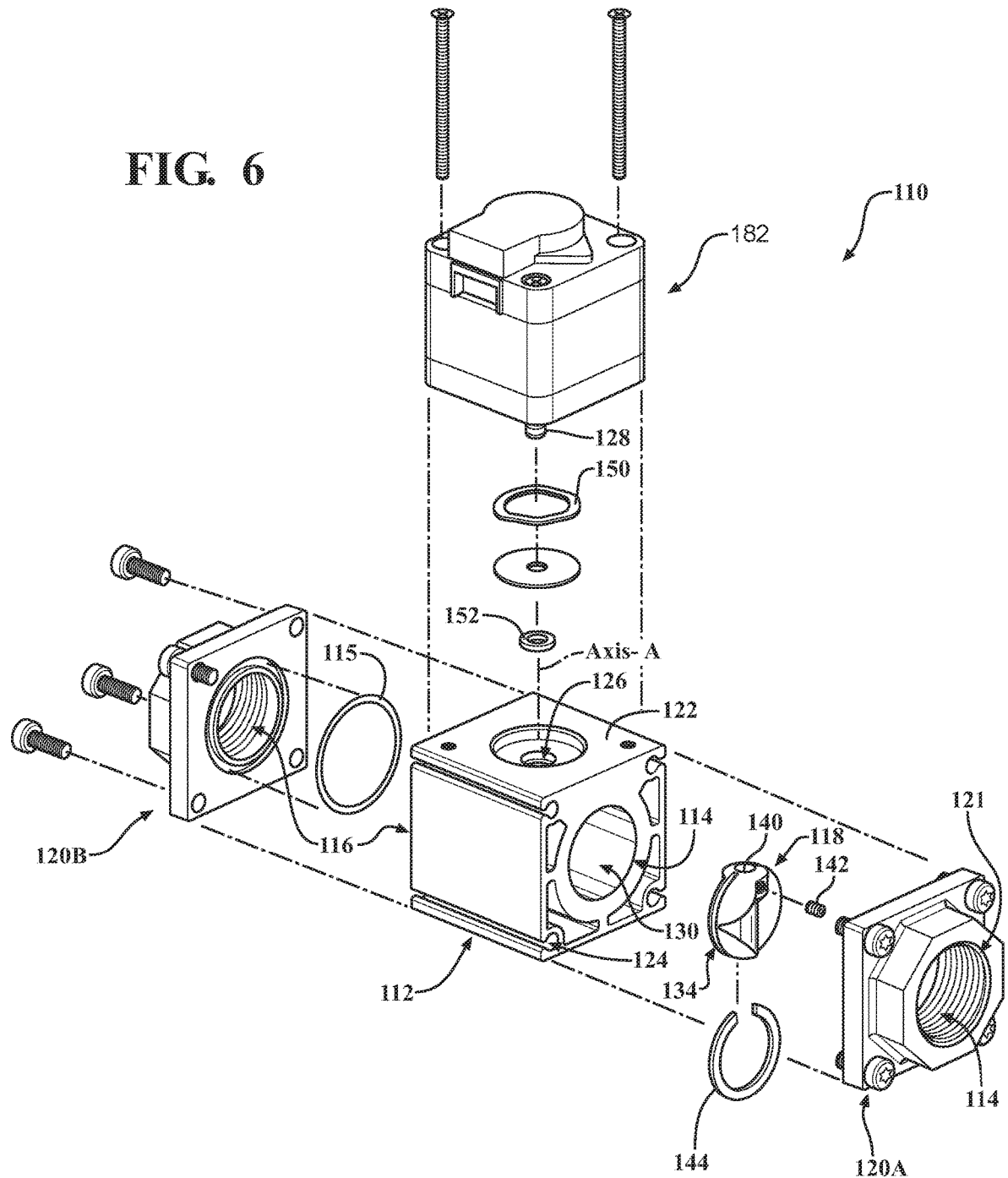

Closed

20°

MULTIFUNCTION VALVE

RELATED APPLICATIONS

This application is a continuation-in-part of U.S. patent application Ser. No. 16/419,615 filed on May 22, 2019, which is a continuation of U.S. patent application Ser. No. 15/414,797 filed on Jan. 25, 2017, which is now U.S. Pat. No. 10,302,204, and which claims priority to and the benefit of U.S. Provisional Patent Application No. 62/288,620 filed on Jan. 29, 2016, the contents of which are hereby incorporated herein by reference in their entirety.

BACKGROUND OF THE INVENTION

1. Field of the Invention

The present invention relates, generally, to fluid flow control and, more specifically, to a multifunction valve.

2. Description of the Related Art

Fluid control systems use a variety of valve types to turn fluid flow on and off, and also to modulate the flow rate through a fluid circuit. Conventional control systems may include valves having complex mechanisms including many components and complicated assemblies. These valves may suffer from a lack of fine precision control and require a larger volume within the fluid circuit.

There remains a need for improved valves for use in fluid control systems that have a simple, compact design for providing easy assembly and a high precision control of variable flow rate. A valve which causes the least amount of pressure drop at a given flow rate can be sold for a wider range of applications, or specifically, can be used where supply pressures are lower or where packaging concerns can be overcome.

BRIEF SUMMARY

The present disclosure overcomes the disadvantages in the related art in providing a multifunction valve simple in design and assembly, compact in size, and precise in flow rate control. Furthermore, present disclosure provides a valve which provides a favorable flow characteristic for closed-loop controls. A linear flow characteristic, for example, means a closed-loop (PID) strategy will have good control at any operating point between the process minimum and maximum.

In this way, a multifunction valve includes a valve body defining an inlet and an outlet, and a flow control gate disposed between the inlet and the outlet. The valve body may define an upper inlet branch and a lower inlet branch, and an interior chamber extending between the upper and lower inlet branches. The valve may also include a control shaft disposed within the interior chamber supporting the flow control gate. A radiused feature at the inlet and outlet of the valve body may provide an increased surface area at an interface with other fluid circuit components.

Also disclosed herein is an improved method of fluid control. The method includes the steps of, first, directing fluid flow through a multifunction valve from an inlet to an outlet, the multifunction valve including a flow control gate, the flow control gate supported on a control shaft in an interior chamber of a valve body; and, second, adjusting the flow rate through the fluid control valve by causing a rotation of the control shaft which adjusts the position of the flow control gate to variably occlude the outlet of the multifunction valve.

The radiused inlet and outlet also increase the open area for a given cross-section. When a filter screen is used on the design of the present disclosure, it will have more open area than a flat opening and therefore be less restrictive to the fluid flow through the filter (FIG. 1 at 14).

BRIEF DESCRIPTION OF THE DRAWINGS

Other objects, features, and advantages of the present invention will be readily appreciated as the same becomes better understood after reading the subsequent description taken in connection with the accompanying drawings, wherein:

FIG. 6 shows an exploded view of a third configuration of a multifunction valve.

DETAILED DESCRIPTION

Figure 1:
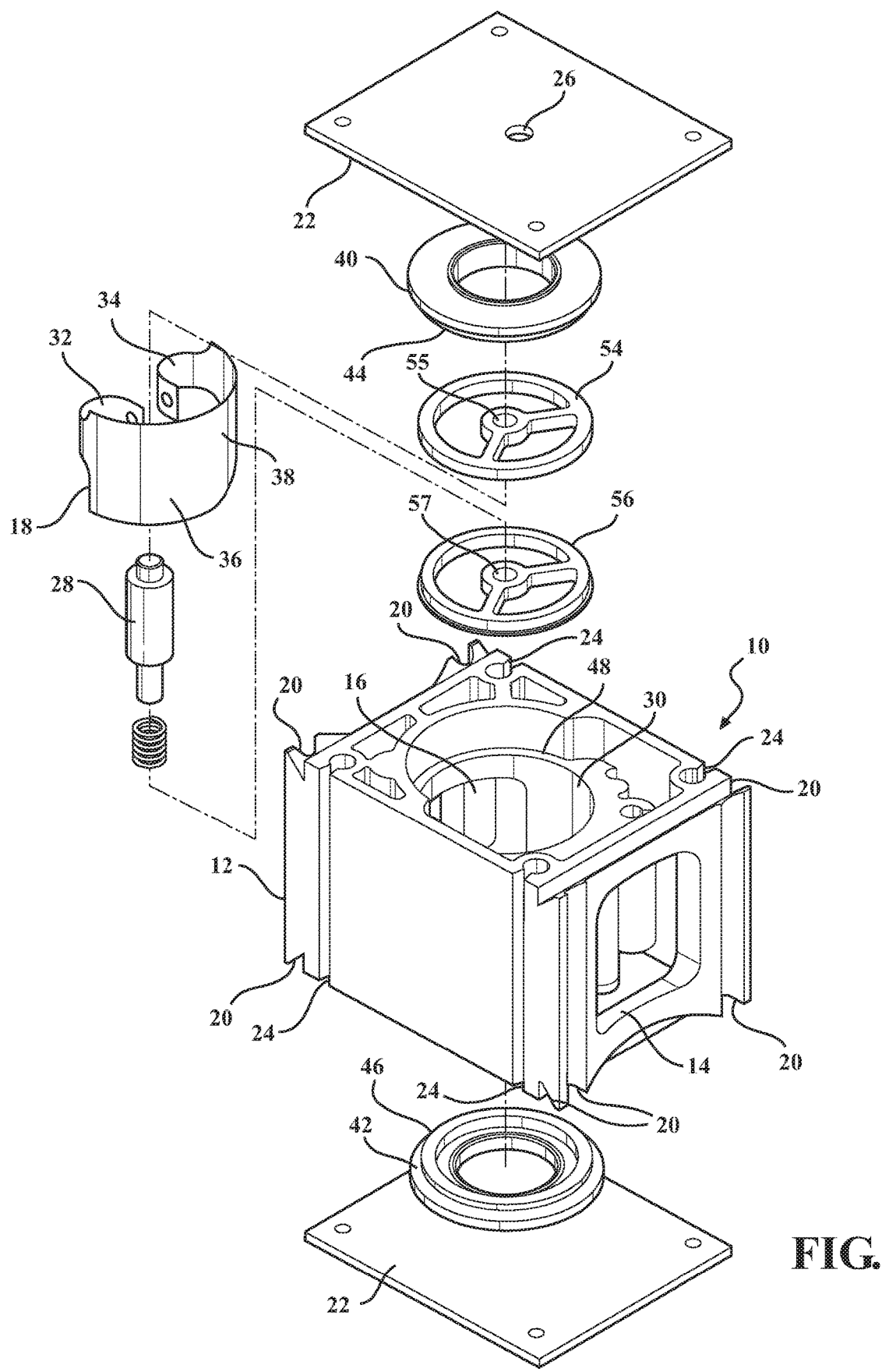
FIG. 1 shows an exploded view of a first configuration of a multifunction valve according to the present disclosure.

With reference now to the drawings, FIG. 1 illustrates a first configuration of a multifunction valve 10 according to the present disclosure, shown in an exploded view. The multifunction valve 10 includes a valve body 12 that can be installed into a fluid circuit to provide flow control. The valve body 12 facilitates fluid flow from an inlet 14 to an outlet 16. The rate of fluid flow through the valve body is modulated by a flow control gate 18 disposed in the valve body 10 and in the fluid flow pathway between the inlet 14 and the outlet 16.

The valve body 12 defines the structure of the multifunction valve, providing an enclosure to the fluid flow pathway secure against fluid leakage and enabling the multifunction valve to be integrated into a fluid circuit. The valve body 12 may be formed from a variety of materials appropriate to the intended function of the multifunction valve, including consideration of the choice of fluid media to be communicated and the operating pressures and velocity for the fluid flow. For example, a high strength material, such as metal, may be selected to form the valve body 12 for the communication of high pressure fluids. The material of the valve body 12, or other components of the multifunction valve 10, may optionally be surface-treated to accommodate the communication of the fluid. For example, a surface treatment may be applied to a metal valve body for the communication of a corrosive fluid or operation in a corrosive environment. Alternatively, the valve body 12 may be formed of a ceramic material, a plastic material, a composite material or other material known in the art to be suitable for constructing valve bodies.

The valve body 12 is formed through conventional fabrication processes appropriate to the material selected to form the valve body 12. For example, a metal valve body 12 may be formed through a process of casting, forging, or machining as appropriate to create the features of the valve body 12. The valve body 12 may be extruded and then machined as needed. Extrusion can provide a capital cost reduction over cast tooling. Additionally, extrusion may avoid common pitfalls of casting complex bodies, such as: porosity, voids, flash and cold shot. Alternatively, a plastic valve body may be formed through a molding process or a deposition process.

The valve body 12 may be provided with attachment features 20 that can facilitate the mechanical retention of valve body 12 to other components in a fluid circuit (not shown). Although depicted with a series of parallel and perpendicular V-shaped and semi-circular channels, the valve body 12 may be modified to incorporate any of a variety of attachment features 20 known in the art. Alternatively, the valve body may exclude attachment features 20 and may be secured to the fluid circuit through other means, such as: welding, brazing, soldering or the like. The appropriate attachment features or securement to incorporate the valve body 12 to the fluid circuit is selected according to knowledge and skill in the art based on the material and construction of the valve body 12 and the material of the fluid circuit components, as well as the fluid to be communicated and the operating pressure and flow rate of that fluid. The valve body 12 may also include other advantageous features to integrate with other components in a fluid circuit. Contoured exterior surfaces at the inlet 14 and the outlet 16 may be radiused, or curved, to increase the overall surface area at the interface between the valve body 12 and another component. When the multifunction valve 10 is used in conjunction with a filter screen at the inlet 14 or outlet 16, this allows the surface area of the filter to be increased, thus improving filter performance and longevity, without requiring an increase in total cross-sectional area at the interface with the multifunction valve.

The multifunction valve 10 also includes cover plates 22 that are secured to the valve body 12 to enclose the fluid flow pathway against communication of the fluid media outside the multifunction valve 10. The cover plates 22 may be secured to the valve body 12 through conventional means known in the art. For example, as shown in FIG. 1, cover plates 22 may be secured against the top and bottom surfaces (as depicted) of the valve body 12. Bolts or other threaded fasteners (not shown) may be provided to extend through the channels 24 and secure the cover plates 22 to the valve body 12. Additionally, gaskets, adhesives, or other filling materials (not shown) may be provided between the cover plates 22 and the top and bottom surface of the valve body 12 to ensure a fluid-tight seal. The selection of cover plate securement is determined by those of skill in the art based on the material of the valve body 12 as well as the fluid to be communicated and the operating pressure and flow rate of that fluid. As will be described in further detail below, one or both of the cover plates 22 may be provided with an aperture 26 for the passage of a control shaft 28.

Within the valve body 12, the flow control gate 18 is provided to modulate the fluid flow rate through the multifunction valve 10. The flow control gate 18 is disposed within an interior chamber 30 of the valve body 12. The interior chamber 30 is depicted in FIG. 1 as a generally cylindrical volume centrally disposed within the valve body 12, although alternative structures are possible without departing from the scope of the present disclosure. The flow control gate 18 is supported within the valve body 12 by a control shaft 28.

Figure 3A:
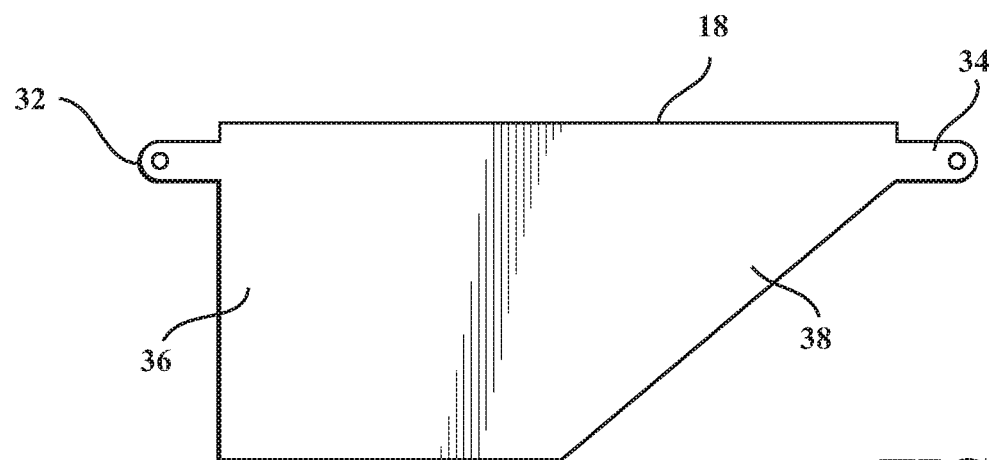
FIGS. 3A-3C show multiple configurations of a flow control gate according to the present disclosure.

As indicated in FIG. 1 and shown in more detail in FIG. 3A, the flow control gate 18 can be understood to comprise a plurality of sections. Two end sections 32, 34 disposed at opposite ends of the flow control gate 18, extend as tabs that can be secured to the control shaft 28. A third section 36 of the flow control gate 18 provides full occlusion of the outlet 16 of the valve body 12. When disposed adjacent to the outlet 16, the full occlusion section 36 of the flow control gate 18 completely covers the outlet 16, thereby preventing fluid from flowing through the multifunction valve 10. A fourth section of the flow control gate 18 is a partial occlusion section 38. The partial occlusion section 38 provides a variable amount of obstruction to the outlet 16 to reduce the flow rate through the multifunction valve 10 from a maximum, unobstructed, fluid flowrate to a terminated, fully-obstructed flow.

In the exemplary configuration, the flow control gate 18 is formed of a resilient material from a flat stock, such as a planar plastic sheet. In the alternative, the flow control gate 18 may be formed of a metal, polymer, or other suitable material. In curving the flow control gate 18 to correspond to the surface of the interior chamber 30 of the valve body 12, the tabs 32 and 34 can be secured to the control shaft 28 with a pin 78, spring clip, mounting block 79, or other mechanical means conventional in the art so that as the control shaft 28 is rotated, a corresponding rotation of the flow control gate 18 is achieved. In the configuration of the flow control gate 18 depicted in FIG. 1, the natural resiliency of the material, in the curved configuration shown, urges the flow control gate 18 against the surface of the interior chamber 30.

The flow control gate 18 is further secured within the interior chamber 30 against axial displacement by upper and lower retaining plates 40 and 42. The upper and lower retaining plates 40 and 42 are annular plates configured to secure to the valve body 12, retaining the control shaft 28 and flow control gate 18 in place within the interior chamber 30. In the exemplary first configuration of the multifunction valve 10, the upper and lower retaining plates 40 and 42 include threaded portions 44 and 46. These threaded portions 44 and 46 allow the upper and lower retaining plates 40 and 42 to be threaded into engagement with corresponding threaded portions on the valve body 12.

The upper and lower retaining plates 40 and 42 may be formed of a suitable material and by conventional means consistent with the selection of material for the valve body 12 and the intended application of the multifunction valve 10. The upper and lower retaining plates 40 and 42 may be formed of the same materials as the valve body 12 or, alternatively, may be formed of a different material. Upper and lower gaskets 50 and 52, shown in FIG. 2, may also be provided at the base of the threaded portions 44 and 46 for ensuring a fluid tight seal between the upper and lower retaining plates 40 and 42, once installed. Upper and lower gaskets 50 and 52 may be provided in the shape of a torus, such as an O-ring, as depicted, or any other suitable gasket or mechanical seal.

Further provided within the interior chamber 30 are upper and lower guide plates 54 and 56. The upper and lower guide plates 54 and 56 create upper and lower channels 58 and 60 between the outer edges of the guide plates 54 and 56 and the surface of the interior chamber 30 in which edges of the flow control gate 18 can be retained. The guide plates 54 and 56, in forming the upper and lower channels 58 and 60, provide a running and retaining surface for the flow control gate 18. The guide plates 54 and 56 further include support apertures 55 and 57, respectively. The support apertures 55 and 57 are centrally disposed guides for the control shaft 28, which radially constrain the control shaft 28 while permitting axial and rotational freedom. The upper and lower guide plates 54 and 56 may be formed integrally with the upper and lower retaining plates 40 and 42 or, alternatively, may be formed as separate components from the upper and lower retaining plates 40 and 42.

Figure 2:
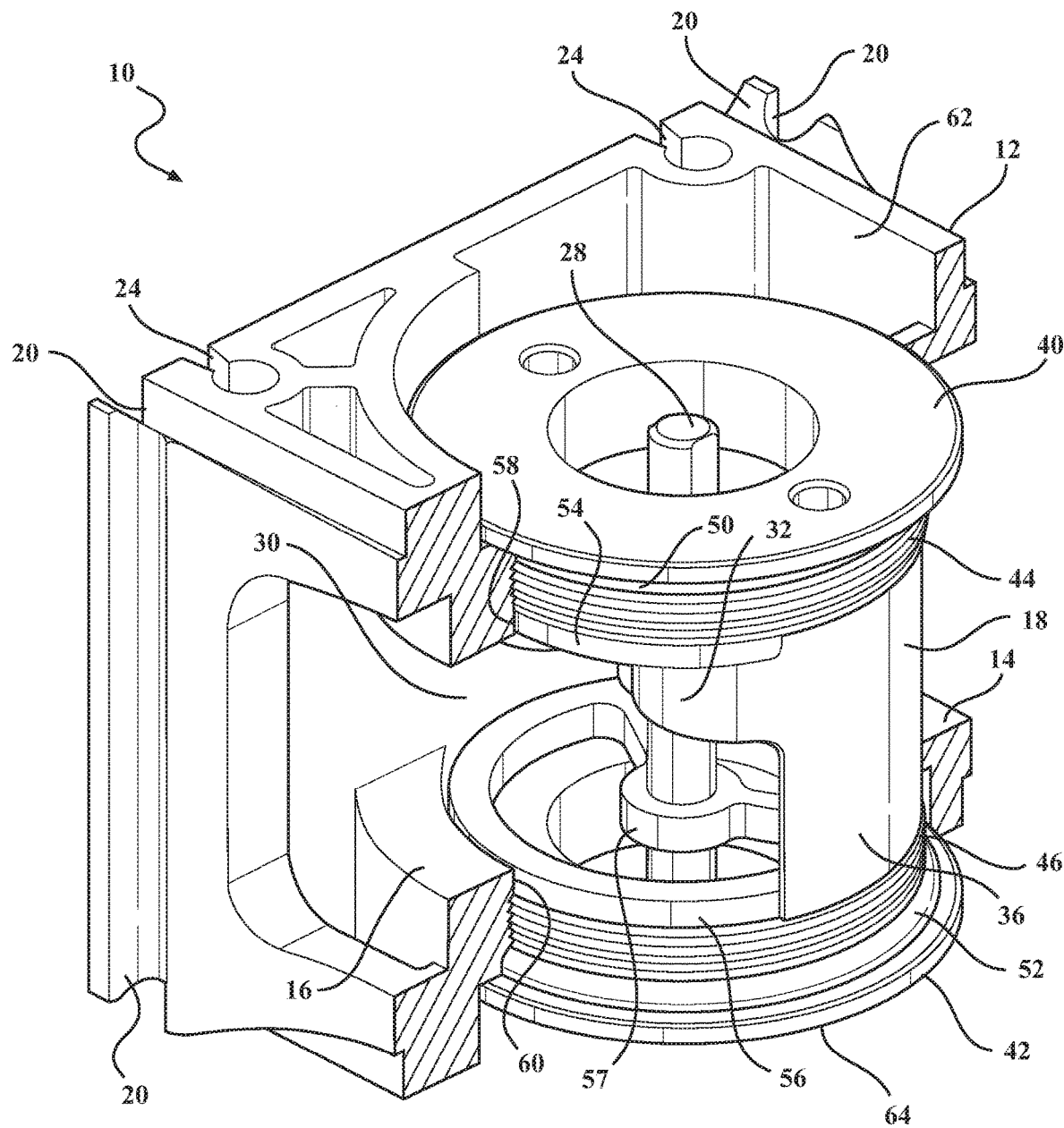
FIG. 2 shows a section view of the multifunction valve of FIG. 1 in partial cutaway view.

Referring now to FIG. 2, a second view of the multifunction valve 10 is shown in partial cutaway. In the orientation shown in FIG. 2, the inlet 14 of the valve body 12 is oriented into the plane of the page, with the outlet 16 oriented out of the plane of the page. In operation, the multifunction valve 10 is connected in series to a fluid circuit at the inlet 14 and the outlet 16. The fluid flowing through the multifunction valve 10 travels from the inlet 14 and is directed into an upper inlet branch 62 and a lower inlet branch 64. The fluid then flows through the upper and lower retaining plates 40 and 42 and past the upper and lower guide plates 54 and 56 into the interior chamber 30. Finally, the fluid flows through the outlet 16 and exits the multifunction valve 10.

As described above, the flow control gate 18 is supported on the control shaft 28 in the interior chamber 30 to modulate the flow rate through the outlet 16 of the valve body 12. The control shaft 28 is further configured to be coupled to a force controller (not shown). The force controller may include, for example, a motor, such as a stepper motor. The control shaft 28 may extend out from the valve body 12 through the aperture 26 of the cover plate 22 to engage with the force controller. In an alternative configuration of the multifunction valve 10, the force controller may mount to the cover plate 22 and include a linkage extending through the cover plate 22 to engage with the control shaft 28. In a further alternative configuration of the multifunction valve 10, the cover plate 22 may be integrated as a component of the force controller, such as a motor housing. In such case, the force controller secures directly to the valve body 12, forming a fluid tight seal and engaging the control shaft 28.

The force controller operates to rotate the control shaft 28 and thereby position the flow control gate 18 within the interior chamber 30. Through a portion of the range of rotation, the flow control gate 18 does not cover any portion of the outlet 16, such as is shown in FIGS. 1 and 2. In this configuration, the fluid flow through the multifunction valve 10 is at a maximum, unrestricted flow rate. In another configuration, where the force controller has operated to position the flow control gate 18 such that the full occlusion section 36 is adjacent to the outlet 16, the outlet 16 is fully covered and no fluid may flow through the multifunction valve 10. In a further configuration, the force controller has operated to rotate the flow control gate 18 such that a portion of the partial occlusion section 38 is adjacent to the outlet 16. In such manner, the fluid flow rate through the multifunction valve 10 can be finely modulated with high precision. The high level of precision control is achieved by selectively rotating the flow control gate 18 to occlude the desired portion of the outlet 16.

Referring to FIG. 3A, a first configuration of the flow control gate 18 is illustrated. The flow control gate 18 includes a constant linear slope through the partial occlusion section 38. This embodiment in FIG. 3A is shown in its flattened form, that is, before it has been curved to be assembled into the valve body 12. As the flow control gate 18 is rotated through the range where the partial occlusion section 38 is adjacent to the outlet 16, the flow rate is modulated in a linear fashion. The edge profile of the partial occlusion section 38 determines profile of modulation. As the partial occlusion section begins to cover the outlet 16, the flow rate would begin to decrease. As the flow control gate 18 is positioned to increasingly cover the outlet 16, the flow rate would incrementally decrease proportionately.

Figure 3B:
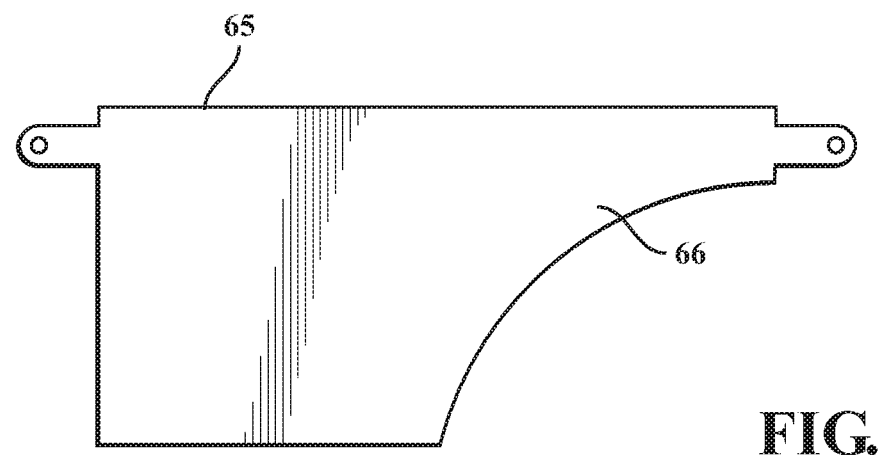
Figure 3C:
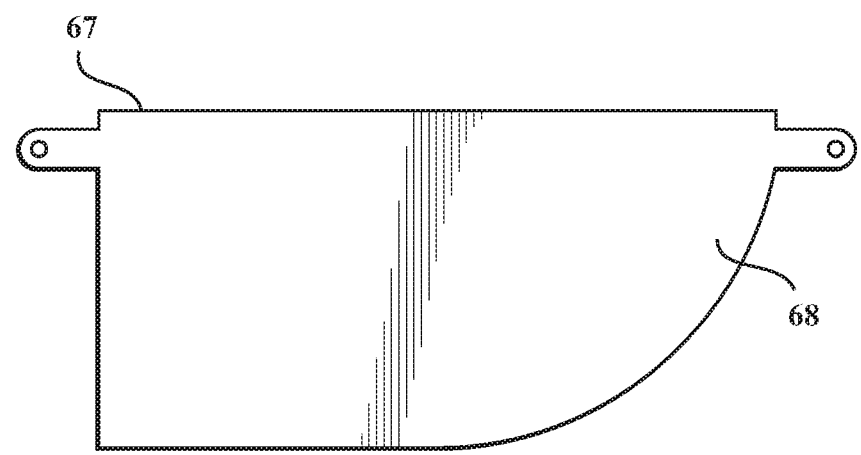

Alternative configurations of the flow control gate 18 are depicted in FIGS. 3B and 3C. Referring to FIG. 3B, a second configuration of a flow control gate 65 is illustrated, the flow control gate 65 having a nonlinear slope through the partial occlusion section 66. This nonlinear slope defines an edge profile that may provide a higher level of precision control through a mid-range of flow rates with less precision control at higher-end or lower-end flow rates. Referring to FIG. 3C, a third configuration of a flow control gate 67 is shown having a nonlinear slope through the partial occlusion section 68 different from that of the second configuration of the flow control gate 65. In the third configuration, the flow control gate 67 may provide a higher level of precision control at lower-end flow rates.

While not illustrated in the Figures, alternative configurations of the flow control gate are contemplated, wherein the partial occlusion section of the flow control gate may be modified or shaped to provide higher levels of increased precision control within specific ranges by tuning the edge profile of the partial occlusion section of the flow control gate. The tuning of the edge profile follows from the principle that a smaller increment of change in the occlusion or coverage of the outlet per an amount of rotation of the flow control gate results in more precise control. That is, for particular example, when using a stepper motor that provides a finite number of discrete steps per revolution, providing a shallower slope in the partial occlusion section of the flow control gate adjacent to the outlet at that step results in a smaller proportional change in occlusion when compared with a steeper slope. Therefore, the higher level of precision in a particular range of flow rates results from the shallower slope of the partial occlusion section.

Figure 4:
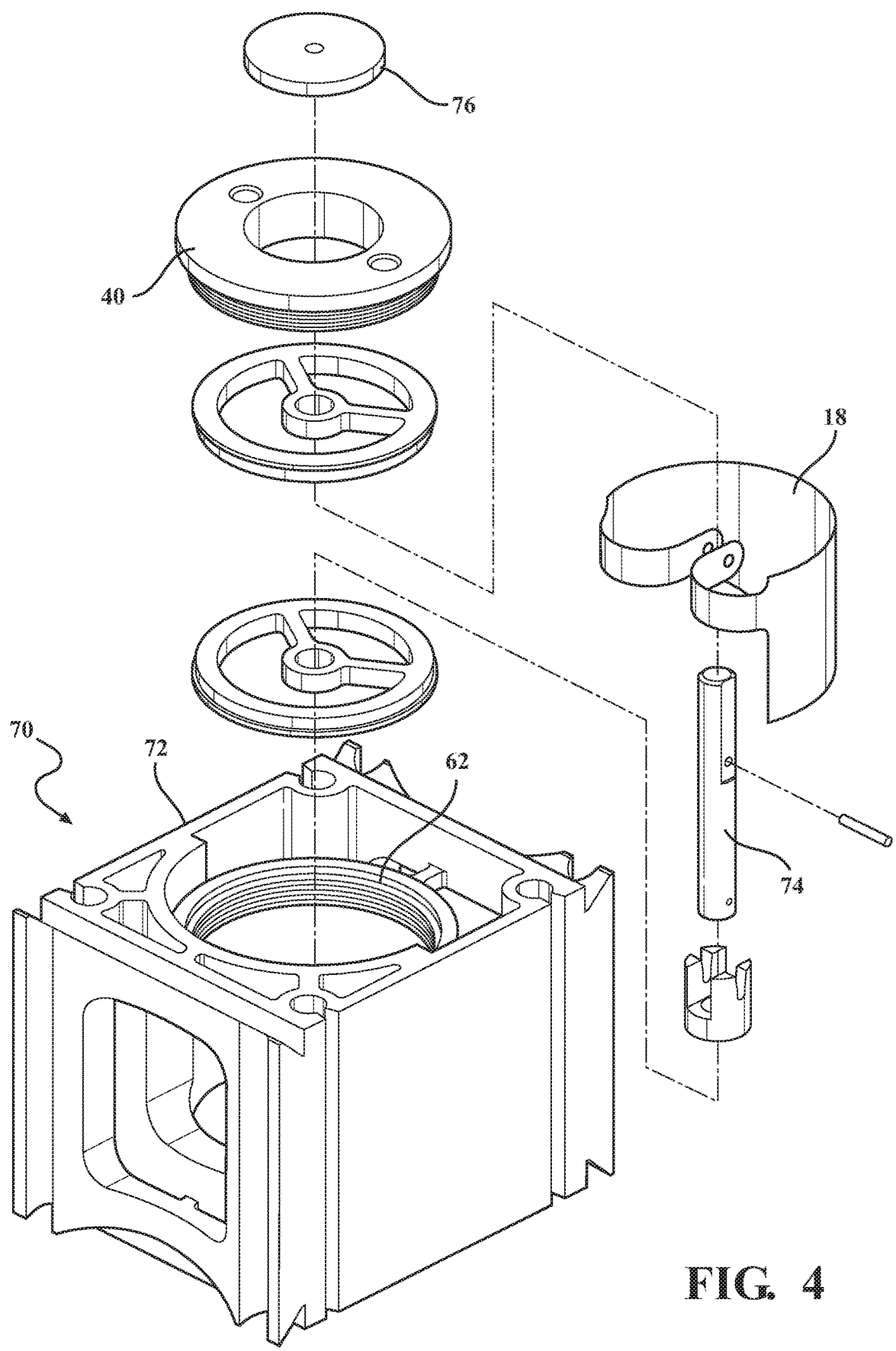
FIG. 4 shows an exploded view of a second configuration of a multifunction valve according to another aspect of the present disclosure.

It is also contemplated that multiple force controllers may be provided in engagement with the control shaft 28. In one such alternative configuration, as shown in FIG. 4, a multifunction valve 70 includes a valve body 72 generally similar to the valve body 72, but formed to include only one inlet branch, for example, an upper inlet branch 62. In this configuration, a control shaft 74 extends from the valve body 72. A first force controller (not shown) engages the control shaft 74 to provide rotational motion to a flow control gate 18. An additional force controller (not shown) may be provided which provides translational motion to the control shaft 74 along its longitudinal axis. A sealing disk 76 may be further provided within the valve body 12 supported on the control shaft 74 and disposed between an upper retaining plate 40 and a cover plate 22 enclosing the upper inlet branch 62. The second force controller may impart axial displacement to the control shaft 74 urging the sealing disk 76 against the annular upper retaining plate 40 to close the fluid flow pathway through the upper retaining plate 40. The sealing disk 76 may be formed of a resilient material suitable for forming a seal against the upper retaining plate 40. In this way, the multifunction valve 70 may be provided with a secondary closing mechanism in addition to the full occlusion section 36 of the flow control gate 18 to prevent fluid flow. It is readily apparent that a single force controller capable of imparting both rotational and axial movement may be used with the multifunction valve 70, in addition to conventional mechanical linkages disposed between the force controller and the multifunction valve 70. In a configuration where the control shaft translates along its axis, a spring, such as a helical spring 29, may be disposed between the control shaft and the guide plate, for example, to return the control shaft to its original position once a sealing force is removed. In alternative configurations, the spring 29 may be omitted and the control shaft may be returned to its original position by the resiliency of the flow control gate 18, and more specifically by the resiliency of the tabs extending as end sections of the flow control gate 18.

Figure 5:
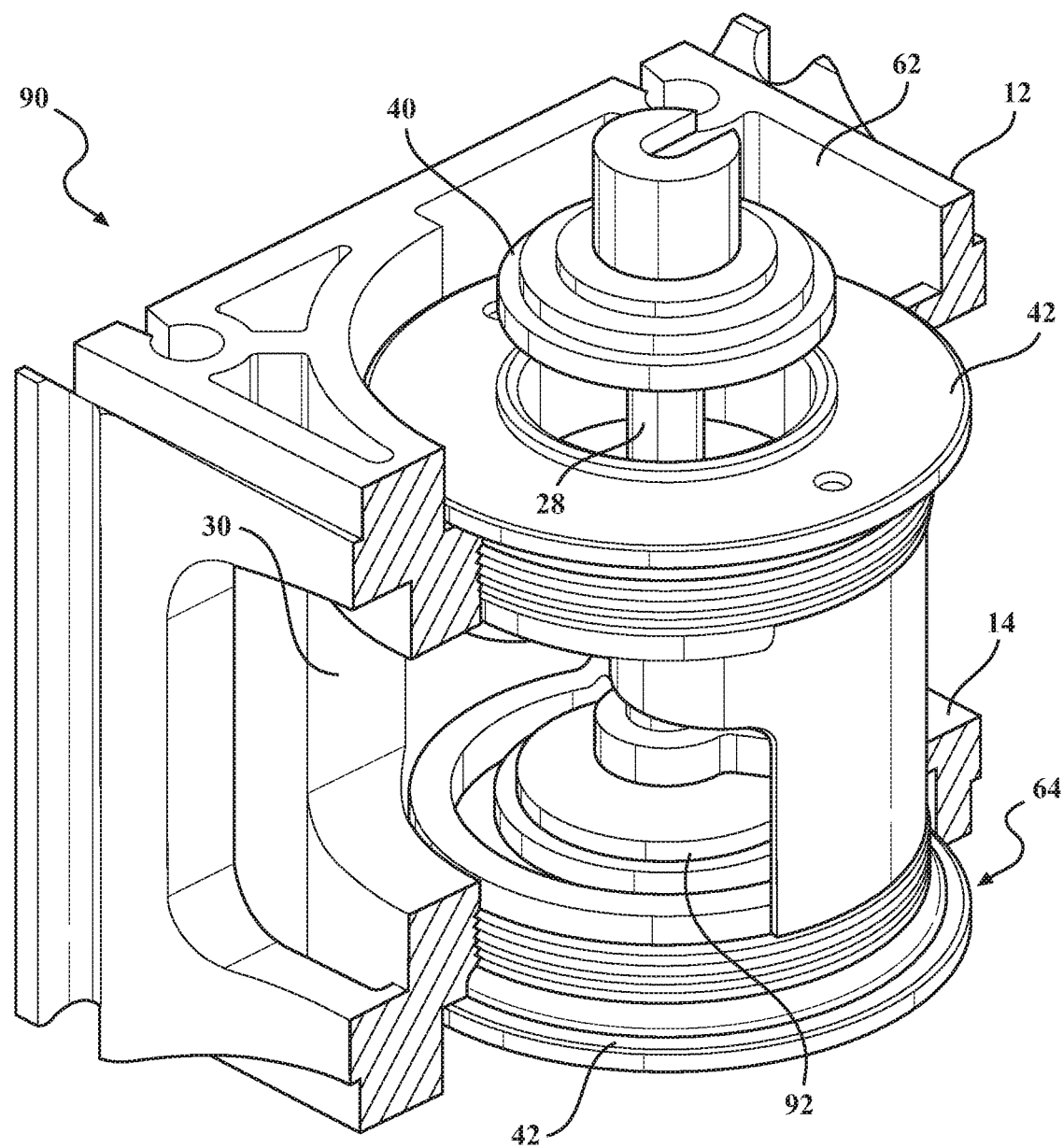
FIG. 5 shows a section view of the second configuration of the multifunction valve of FIG. 4.

A further alternative configuration of a multifunction valve 90 according to the present disclosure is shown in FIG. 5. The multifunction valve 90 includes the valve body 12 having the inlet 14, and including upper and lower inlet branches 62 and 64. Similar to the earlier described configuration, a sealing disk 96 is supported on the control shaft 28 between the upper retaining plate 40 and a cover plate 22 (not shown). In this configuration, a second sealing disk 92 is supported on the control shaft 28 in the interior chamber 30. In this way, the control shaft 28 can be positioned such that the sealing disk 96 and the second sealing disk 92 can be simultaneously urged against both the upper and lower retaining plates 40 and 42 as the sealing disks 96 and 92 move with the control shaft 28. This seals the interior chamber 30 against both the upper and lower inlet branches 62 and 64. Providing upper and lower inlet branches 62 and 64 assists in maintaining a high capacity through the multifunction valve 90 and minimizes the introduction of further pressure drops as a fluid flows through the multifunction valve 90.

Referring to FIG. 6, a third configuration of a multifunction valve 110 is illustrated in an exploded view. The multifunction valve 110 includes a valve body 112 that can be installed into a fluid circuit to provide flow control. The valve body 112 may define an interior chamber 130. The valve body 112 may also comprise an inlet 114 to an outlet 116 in fluid communication with the interior chamber 130 and configured to facilitate fluid flow through the valve body 112. The rate of fluid flow through the valve body 112 may be modulated by a flow control gate 118 disposed in the interior chamber 130 of the valve body 112, said flow control positioned in the fluid flow pathway defined by the interior chamber 130 between the inlet 114 and the outlet 116.

The valve body 112 defines the structure of the multifunction valve 110, providing an enclosure to the fluid flow pathway secure against fluid leakage and enabling the multifunction valve 110 to be integrated into a fluid circuit. The valve body 112 may be formed from a variety of materials appropriate to the intended function of the multifunction valve 110, including consideration of the choice of fluid media to be communicated and the operating pressures and velocity for the fluid flow. For example, a high strength material, such as metal, may be selected to form the valve body 112 for the communication of high pressure fluids. The material of the valve body 112, or other components of the multifunction valve 110, may optionally be surface-treated to accommodate the communication of the fluid. For example, a surface treatment may be applied to a metal valve body for the communication of a corrosive fluid, or operation in a corrosive environment. Alternatively, the valve body 112 may be formed of a ceramic material, a plastic material, a composite material or other material known in the art to be suitable for constructing valve bodies.

The valve body 112 is formed through conventional fabrication processes appropriate to the material selected to form the valve body 112. For example, a metal valve body 112 may be formed through a process of casting, forging, or machining as appropriate to create the features of the valve body 112. The valve body 112 may be extruded and then machined as needed. Extrusion can provide a capital cost reduction over cast tooling. Additionally, extrusion may avoid common pitfalls of casting complex bodies, such as: porosity, voids, flash and cold shot. Alternatively, a plastic valve body 112 may be formed through a molding process or a deposition process.

The valve body 112 may be provided with attachment features 120 that can facilitate the mechanical retention of the valve body 112 to other components in a fluid circuit (not shown). The valve body 112 may comprise a series of parallel slots 124 and/or semi-circular channels including a retention feature configured to allow for coupling of the attachment feature 120 to the valve body 112. However, it is contemplated that the valve body 112 may be modified to incorporate any of a variety of attachment features 120 known in the art.

The valve body 112 may comprise one or more attachment features 120 and may be secured to the valve body 112 and configured to couple and/or connect the valve body 112 to the fluid circuit through other means. For example, the one or more attachment features 120 may be coupled to the valve body 112 via welding, brazing, soldering, epoxy, adhesive, or the like. It is also contemplated that the one or more attachment features 120 may be removably coupled to the valve body 112 via screws, bolts, or a similar fastener. The attachment features 120 may also comprise a gasket or seal 115 disposed between the attachment features 120 and the valve body 112 when the attachment features 120 are coupled to the valve body 112. The gasket or seal 115 may be configured to provide a leak-proof seal between the attachment features 120 and the valve body 112.

The attachment features 120 may comprise an attachment portion 121 for the connecting attachment feature 120, and by extension the valve body 112, to the fluid circuit. For example, the attachment portion 121 may comprise threading configured to couple to a complementary threaded pipe or similar component of the fluid circuit. While not illustrated in the Figures, it is contemplated that the attachment portion 121 may be configured to couple to a pipe or similar component of the fluid circuit via welding, brazing, soldering or the like. The attachment features 120 may serve as a universal coupling feature allowing for a single size or style valve body 112 to be coupled to various sized, shaped, and/or types of fluid circuits. For example, using a first configuration of the attachment feature 120 including one style and/or size of attachment portion 121, such as ¾-inch threading, may allow the valve body 112 to be coupled to the fluid circuit. Alternatively, using a second configuration of the attachment feature 120 including an alternative style and/or size of attachment portion 121, such as a ½-inch receiver for brazing, may allow the same valve body 112 to be coupled to the fluid circuit requiring this form of coupling. The appropriate attachment features 120 or securement to incorporate the valve body 112 to the fluid circuit is selected according to knowledge and skill in the art based on the material and construction of the valve body 112 and the material of the fluid circuit components, as well as the fluid to be communicated and the operating pressure and flow rate of that fluid.

The valve body 112 may also include other advantageous features to integrate with other components in a fluid circuit. Contoured exterior surfaces at the inlet 114 and the outlet 116 may be radiused, or curved, to increase the overall surface area at the interface between the valve body 112 and another component. The attachment portion 121 of the attachment features 120 may similarly be radiused, or curved, to increase the overall surface area at the interface between the attachment features 120 and the valve body 112 and/or another component of the fluid circuit. When the multifunction valve 110 is used in conjunction with a filter screen at the inlet 114 or outlet 116, this allows the surface area of the filter to be increased, thus improving filter performance and longevity, without requiring an increase in total cross-sectional area at the interface with the multifunction valve.

The multifunction valve 110 may further comprise a force controller 182. The force controller 182 may be coupled to the valve body 112 and configured to manipulate the position and/or orientation of the flow control gate 118 that is disposed within the interior chamber 130 of the valve body 112. For example, the force controller 182 may be fixedly or removably mounted to an outer surface 122 of the valve body 112, as illustrated in FIG. 1. Alternatively, it is also contemplated that the force controller 182 may be disposed within a compartment formed in the valve body 112. The force controller 182 may comprise a step motor, or similar mechanism capable of manipulating the position and/or orientation of the flow control gate 118 that is disposed within the interior chamber 130. For example, the force controller 182 may comprise a step motor configured to variably rotate the flow control gate 118 within the interior chamber 130 of the valve body 112.

The force controller 182 may further comprise a control shaft 128. The control shaft 128 may be at least partially disposed in the interior chamber 130 of the valve body 112 and configured to support and/or modulate the flow control gate 118 to manipulate the flow rate through the outlet 116 of the valve body 112. The control shaft 128 may extend from the force controller 182 and through an aperture 126 in the valve body 112 to engage the flow control gate 118 disposed within the interior chamber 130.

One or more gaskets or seals 150, 152 may be disposed between the force controller 182 and the valve body 112 when the force controller 182 and the valve body 112 are coupled together to form a generally leak-proof seal or barrier between the force controller 182 and the valve body 112. The one or more gaskets or seals 150, 152 may comprise an aperture 126 such that the gaskets or seals 150, 152 may at least partially surround the control shaft 128 of the force controller 182.

In operation, the force controller 182 operates to rotate the control shaft 128 and thereby position the flow control gate 118 within the interior chamber 130. Depending on the position of the flow control gate 118, the flow control gate 118 may completely seal/close the interior chamber 130, preventing any fluid from exiting the outlet 116. However, as the force controller 182 rotates the control shaft 128, and by extension the flow control gate 118, it varies the amount of the interior chamber 130 that is exposed/opened, allowing fluid to flow through the multifunction valve 110 and out the outlet 116 at varying rates. A high level of precision control may be achieved by selectively rotating the flow control gate 118 to occlude the desired portion of the interior chamber 130 to control fluid flow through the outlet 116.

Figure 7A:
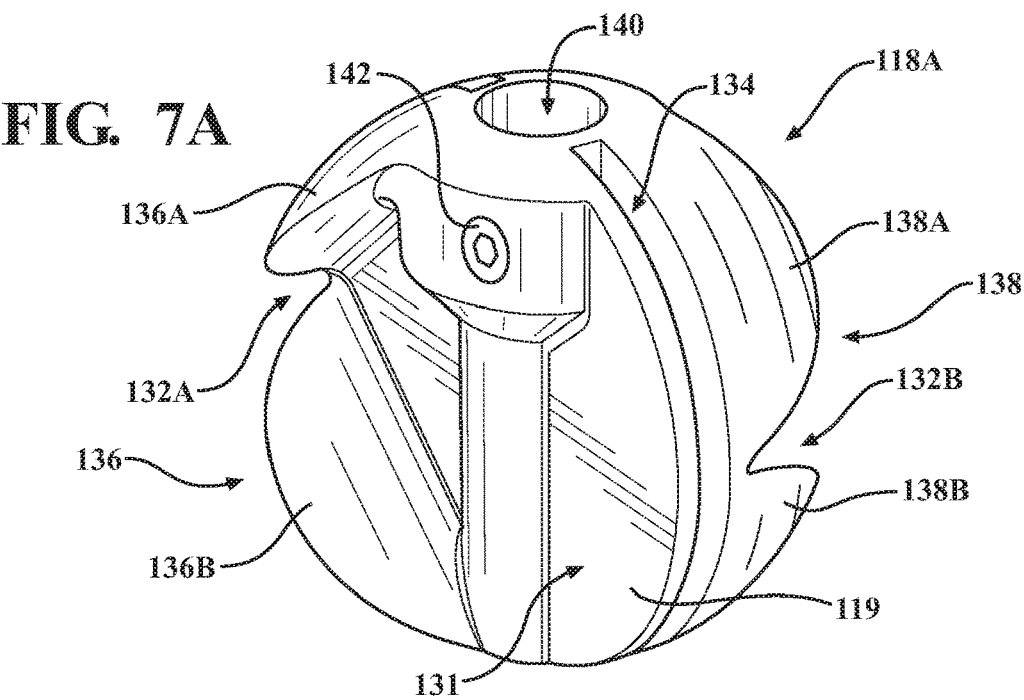
FIG. 7A shows a perspective view of a first configuration of a flow control gate for use with the multifunction valve of FIG. 6.
Figure 7B:
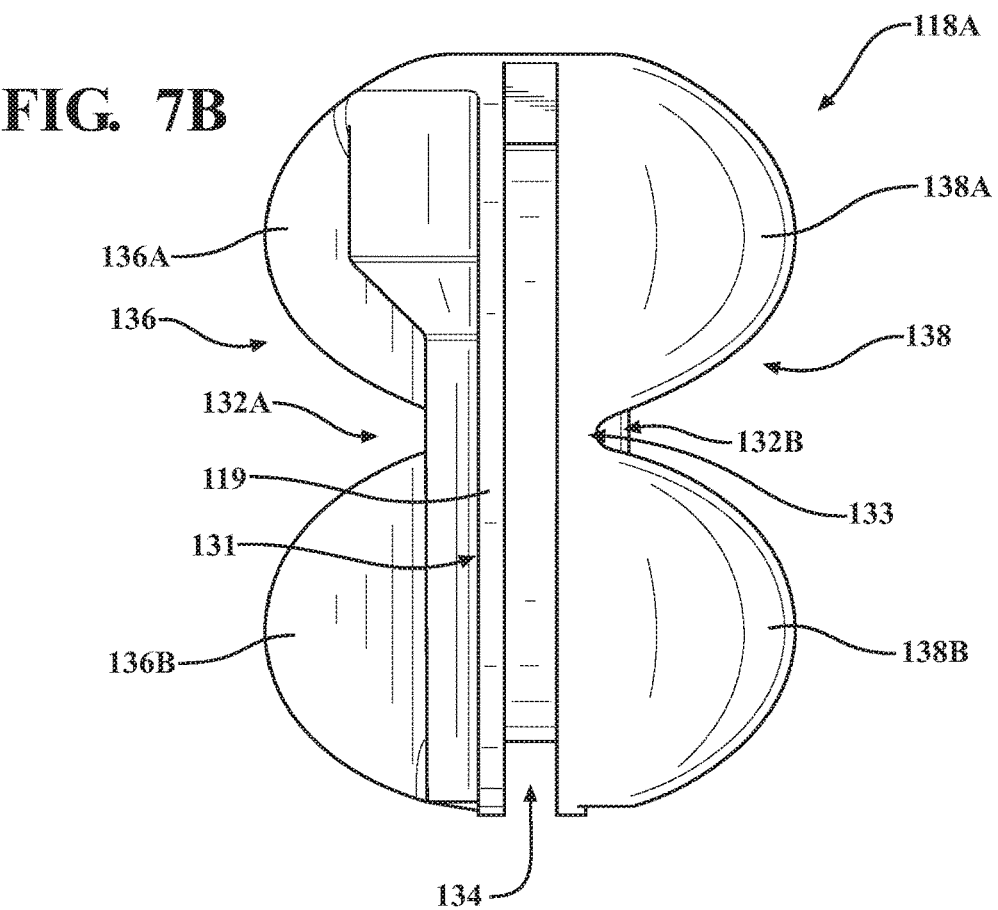
FIG. 7B shows a side view of the first configuration of the flow control gate of FIG. 7A.
Figure 7C:
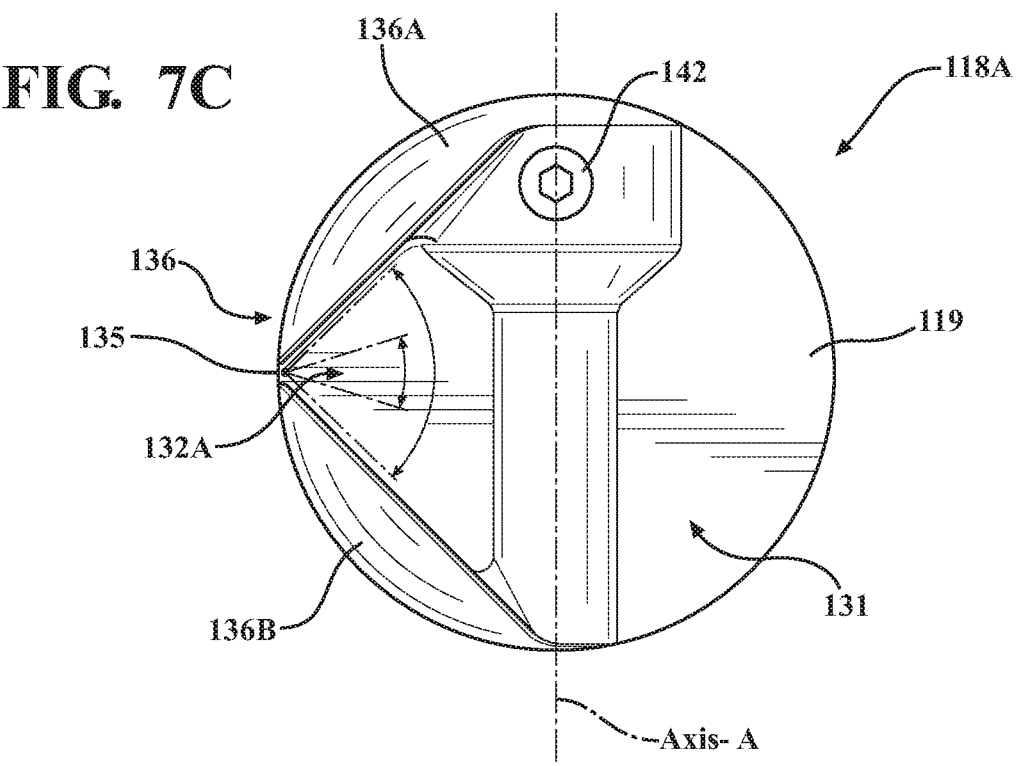
FIG. 7C shows a top view of the first configuration of the flow control gate of FIG. 7A.

Referring to FIGS. 7A-7D, exemplary configurations of a flow control gate 118 are illustrated. FIGS. 7A-7C illustrate a first configuration of a flow control gate 118A for use with the multifunction valve 110 described above. The flow control gate 118A comprises a body 119 having a first surface 131 and an opposing second surface 133.

The flow control gate 118A may also comprise a coupling feature 140 for coupling the flow control gate 118A to the control shaft 128 of the force controller 182. The coupling feature 140 may comprise an aperture in the outer perimeter that extends into the body 119 of the flow control gate 118A, such that the longitudinal axis, Axis-A, of the coupling feature 140 defines the axis about which the force controller 182 rotates the flow control gate 118A. The coupling feature 140 may further comprise a retention feature 142, wherein the retention feature 142 may be configured to couple the flow control gate 118A to the control shaft 128 of the force controller 182 when the control shaft 128 is at least partially disposed in the coupling feature 140. For example, when the coupling feature 140 comprises an aperture, the retention feature 142 may comprise a screw, set screw, pin, or similar fastener configured to couple the flow control gate 118A to the control shaft 128. In the exemplary first configuration of the flow control gate 118A illustrated in FIGS. 7A-7C, the coupling feature 140 comprises an aperture in the body 119 of the flow control gate 118A and the retention feature 142 comprises a set screw. In operation, once the control shaft 128 of the force controller 182 is inserted in the coupling feature 140, the retention feature 142 may be tightened to create a friction fit with the control shaft 128 to removably couple the flow control gate 118A to the control shaft 128. It is contemplated that the control shaft 128 may comprise an aperture, indent, recess, slot, or similar complementary feature configured to at least partially receive the retention feature 142 when the flow control gate 118A is coupled to the control shaft 128. It is also contemplated that the coupling feature 140 of may couple the flow control gate 118A to the control shaft 128, and the control shaft 128 may comprise complementary shapes. For example, the control shaft 128 may comprise a hexagonal shape, and the coupling feature 140 may comprise a complementary-shaped aperture. This may assist the force controller 182 in rotating or otherwise manipulating the flow control gate 118A via the control shaft 128.

The flow control gate 118A may also comprise a recess 134 in the outer perimeter of the body 119. The recess 134 may comprise an indent, track, slot, slit, or similarly shaped recessed portion in the outer perimeter of the body 119 of the flow control gate 118A. The recess 134 may be configured to at least partially encircle the flow control gate 118A. For example, as illustrated FIGS. 7A and 7B, the recess 134 may be configured to encircle almost the entire perimeter of the body 119, excluding the location of the coupling feature 140. The recess 134 may be configured to receive a sealing member 144, best illustrated in FIG. 6. The sealing member 144 may comprise a ring-like shape that corresponds to the shape of the recess 134. The sealing member 144 may be configured to be at least partially disposed in the recess 134 when the flow control gate 118A is disposed in the interior chamber 130 of the valve body 112. The sealing member 144 may form a seal between the outer perimeter of the flow control gate 118A and the interior surface of the interior chamber 130 to prevent fluid flow through the interior chamber 130 when the flow control gate 118A is oriented in a closed position.

The flow control gate 118A may further comprise a first protrusion 136 extending from the first surface 131 of the body 119. The flow control gate 118A may also comprise a second protrusion 138 extending from the second surface 133 of the body 119. Each of the first and second protrusions 136, 138 may generally comprise a spherical shape that is curved or rounded as it extends away from the first or second surfaces 131, 133 respectively. The first and second protrusions 136, 138 are positioned near the perimeter of the body 119 of the flow control gate 118A. It is also contemplated that the first and second protrusions 136, 138 may be positioned such that the first and second protrusions 136, 138 are on opposing sides of the Axis-A or centerline of the body 119 when viewed orthogonally relative to either the first surface 131 or the second surface 133 of the body 119.

Each of the first and second protrusions 136, 138 may comprise a cut-out portion 132. For example, the first protrusion 136 may comprise a first cutout 132A and the second protrusion 138 may comprise a second cutout 132B. The first and second cutouts 132A and 132B may be configured such that they divide the first protrusion 136 into a first portion 136A and a second portion 136B and divide the second protrusion 138 into a first portion 138A and a second portion 138B. Because the first and second protrusions 136, 138 are generally spherical and curved-shaped, the resulting outer edge of each of the first and second portions 136A, 136B of the first protrusion 136 and each of the first and second portions 138A, 138B of the second protrusion 138 may comprise a generally curved outer edge. This allows the flow control gate 118A to be pivoted or rotated within a generally circular- or round-shaped interior chamber 130 of the valve body 112.

Referring to FIG. 7C, a top view of the flow control 118A is illustrated, showing the shape of the cutout 132A in the second protrusion 138 forming the first portion 138A and the second portion 138B. When viewed orthogonally relative to the second surface 133 of the body 119, it can be seen that the cutout 132A comprises a generally V-shaped or triangular shape that projects outward from the second surface 133 and removes a portion of the second protrusion 138. The vertex or point 135 of the triangle is generally positioned at or near the perimeter or outer edge of the body 119 to define the first portion 138A and the second portion 138B of the protrusion 138 on opposing sides of the vertex 135. While an exemplary configuration of a V-shaped cutout 132A has a first angle, it is contemplated, as illustrated using dotted lines, that the angle of the V-shaped cutout 132A may be varied. As will be discussed in greater detail below, this will allow for changes to be made to the fluid flow rate through the multifunction valve 110 based on the profile of the first and second protrusions 136, 138 of the flow control gate 118A based on size and/or shape of the cutout 132A and the position of the flow control gate 118A within the interior chamber 130.

Figure 7D:
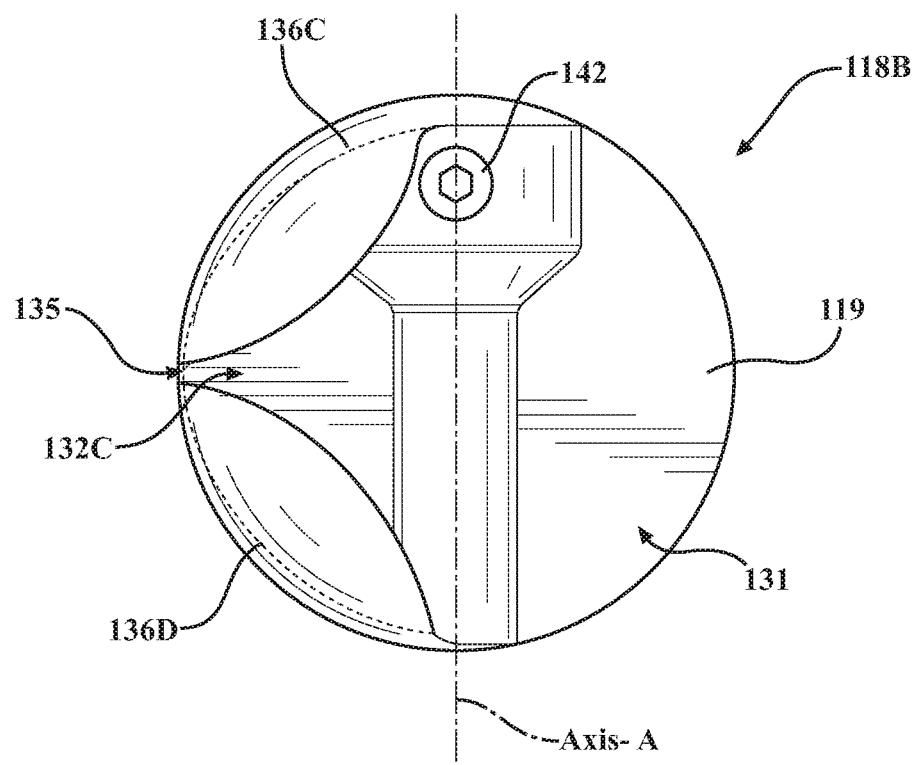
FIG. 7D shows a top view of a second configuration of a flow control gate for use with the multifunction valve of FIG. 6.

Referring to FIG. 7D, a second configuration of a flow control gate 118B for use with the multifunction valve 110 described above is illustrated. Many of the features of the second configuration of the flow control gate 118B may operate and be formed similarly to those described above with regard to the first configuration of the flow control gate 118A. However, FIG. 7D illustrates an alternative configuration of the cutout 132C. Whereas FIG. 7C illustrated a generally V-shaped cutout 132A including straight lines meeting at a vertex or point 135, FIG. 7D illustrates an exemplary configuration of the cutout 132C including a generally arch-shaped cutout meeting a vertex or point 135 positioned at the perimeter of the body 119 of the flow control gate 118B. The arched-shaped cutout 132C may be generally convex, as illustrated in FIG. 7D, to create one fluid flow rate through the multifunction valve 110 based on the position of the flow control gate 118B within the interior chamber 130. By contrast, it is also contemplated that the arched-shaped cutout 132C may be generally concave, as illustrated in FIG. 7D using dotted lines. This would create a second fluid flow rate through the multifunction valve 110 based on the position of the flow control gate 118B within the interior chamber 130. While not illustrated, additional profiles for the cutout 132 of the first and the second protrusions 136, 138 are contemplated. Generally, any shape may be projected out orthogonally from the first or second surfaces 131, 133 of the body 119 of the flow control gate 118 to remove a portion of the generally spherical- or curved-shaped first and/or second protrusions 136, 138 to modify the flow profile of fluid through the valve body 112 based on the position of the flow control gate 118 within the interior chamber 130.

Referring to FIGS. 8A-8E, an exemplary configuration of a multifunction valve 110 including a flow control gate 118 oriented at various positions within the valve body 112 is illustrated. Each of FIGS. 8A-8E illustrates the multifunction valve 110 from the perspective of looking into the interior chamber 130 of the valve body 112 through the inlet 114. As described above, the flow control gate 118 comprises the first and second protrusions 136, 138 extending from the body 119 on opposing sides of the axis, Axis-A, defined by the coupling feature 140. A cutout 132A, 132B is formed in each of the first and second protrusions 136, 138 to define the first portion 136A, 138A and the second portion 136B, 138B of each of the first and second protrusions 136, 138, respectively. As described above, the multifunction valve 110 may comprise a force controller 182 (not shown in FIGS. 8A-8E) coupled to the flow control gate 118 by the control shaft 128 (not shown in FIGS. 8A-8E). The force controller 182, via the control shaft 128, may be configured to rotate the flow control gate 118 within the interior chamber 130 about an axis, Axis-A, defined by the control shaft 128 and/or the coupling feature 140 of the flow control gate 118. The force controller may be programmed to move/rotate the flow control gate 118 via the control shaft 128 in any number of increments and/or degrees to provide a precise fluid flow rate through the interior chamber 130. By using a configuration of the flow control gate 118 that includes the first and second protrusions 136, 138, including cutouts 132A, 132B, 132C, the fluid flow rate through the interior chamber 130 may allow the multifunction valve 110 to produce a generally linear profile for the flow rate compared to the valve position, resulting in a constant gain or efficiency of the multifunction valve 110 across the various positions of the flow control gate 118. Whereas a generic butterfly valve comprising a simple disc-shaped valve member typically produces a curved/non-linear profile with regard to the flow rate compared to the valve position create peaks and valleys in terms of gains and/or efficiency of the valve across the various positions of the valve member.

Figure 8A:
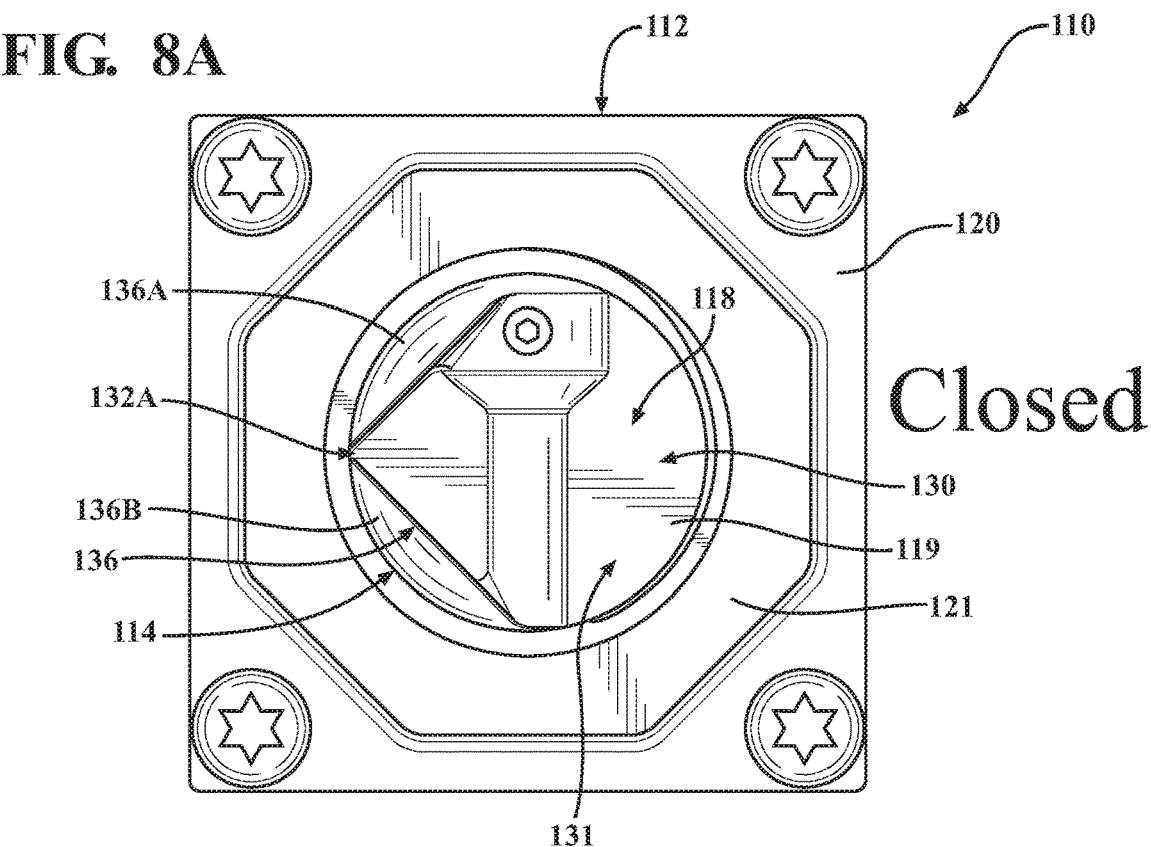
FIG. 8A shows a front view of the multifunction valve of FIG. 6 including the flow control gate in a first position.
Figure 8B:
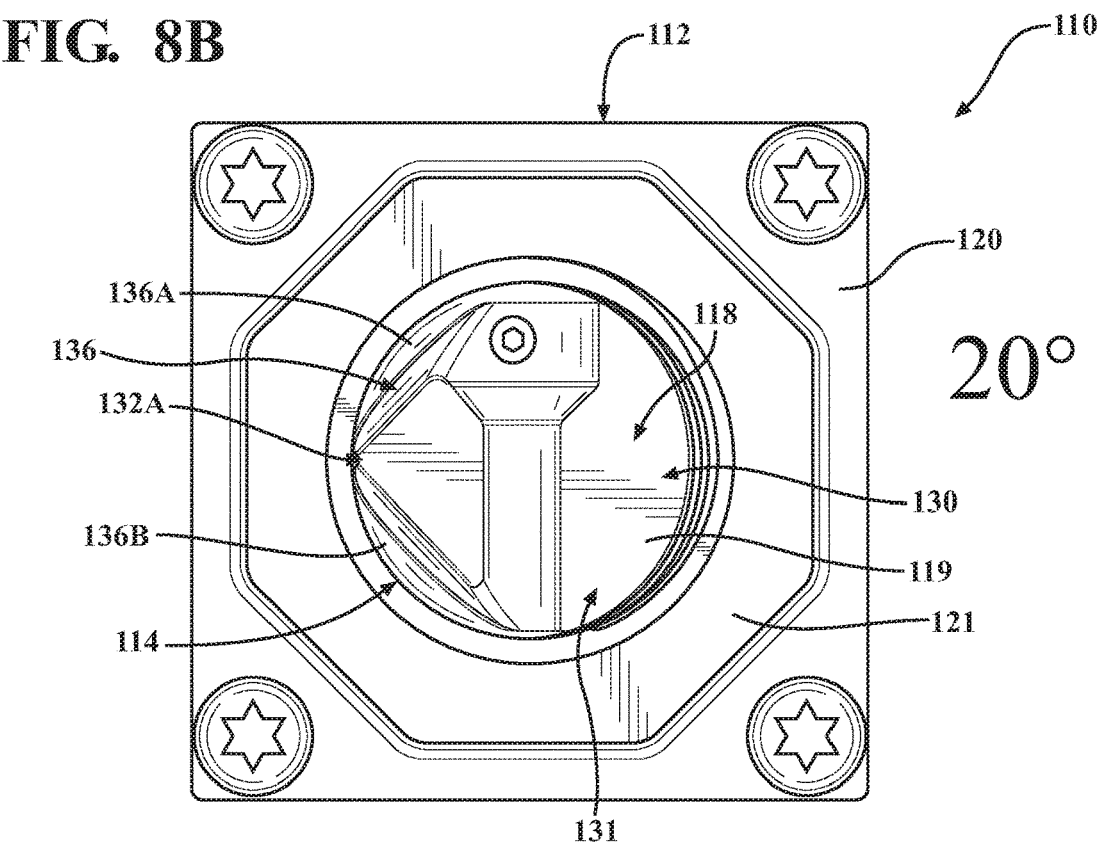
FIG. 8B shows a front view of the multifunction valve of FIG. 6 including the flow control gate in a second position.
Figure 8C:
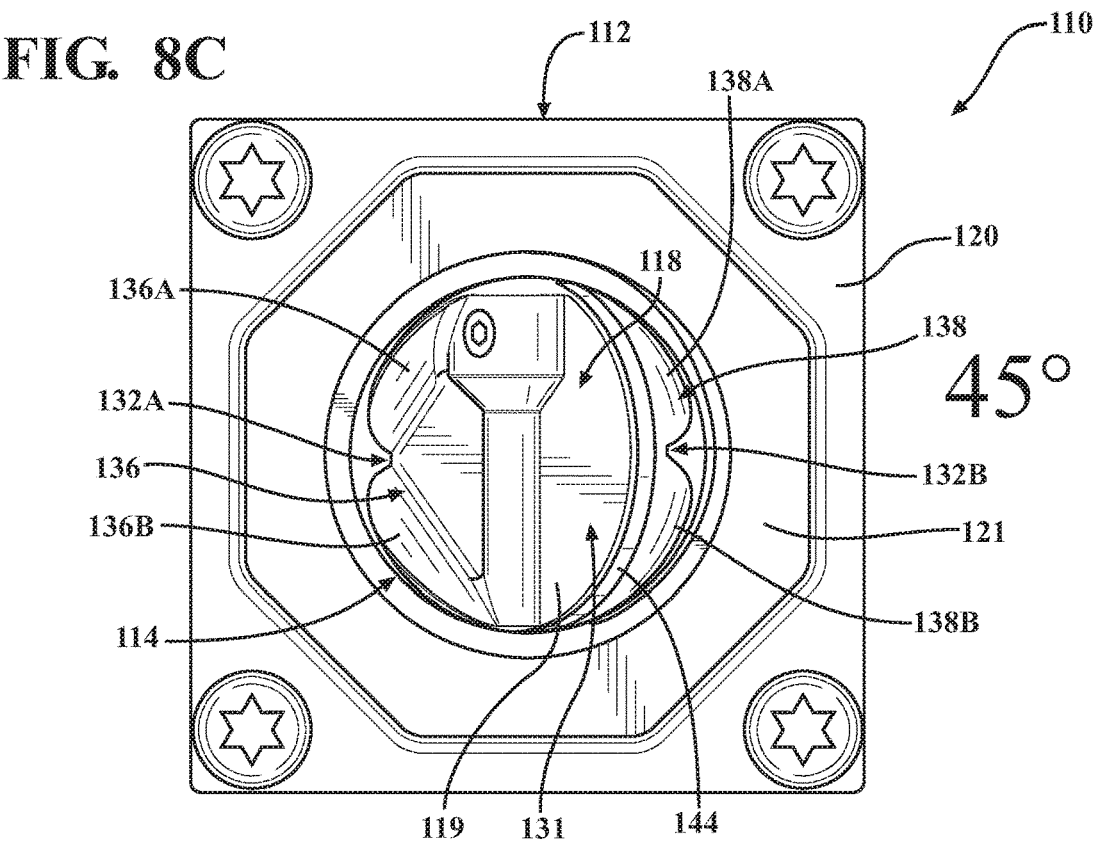
FIG. 8C shows a front view of the multifunction valve of FIG. 6 including the flow control gate in a third position.
Figure 8D:
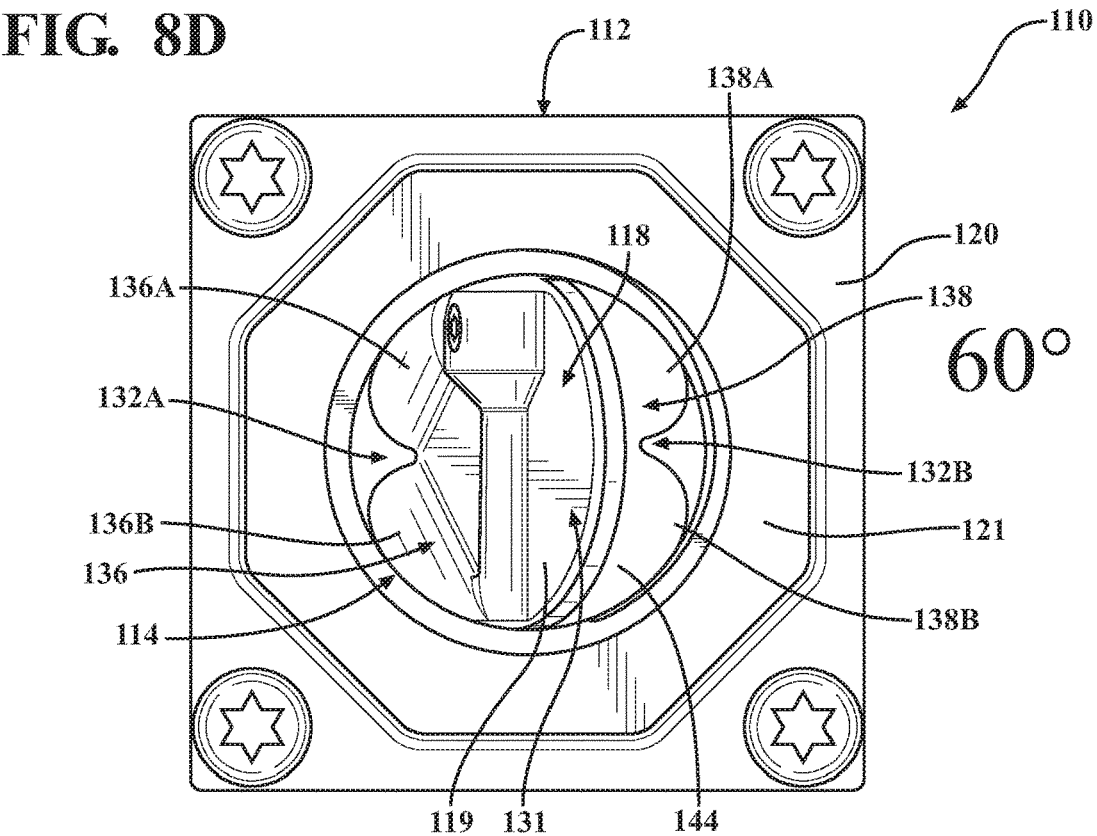
FIG. 8D shows a front view of the multifunction valve of FIG. 6 including the flow control gate in a fourth position.
Figure 8E:
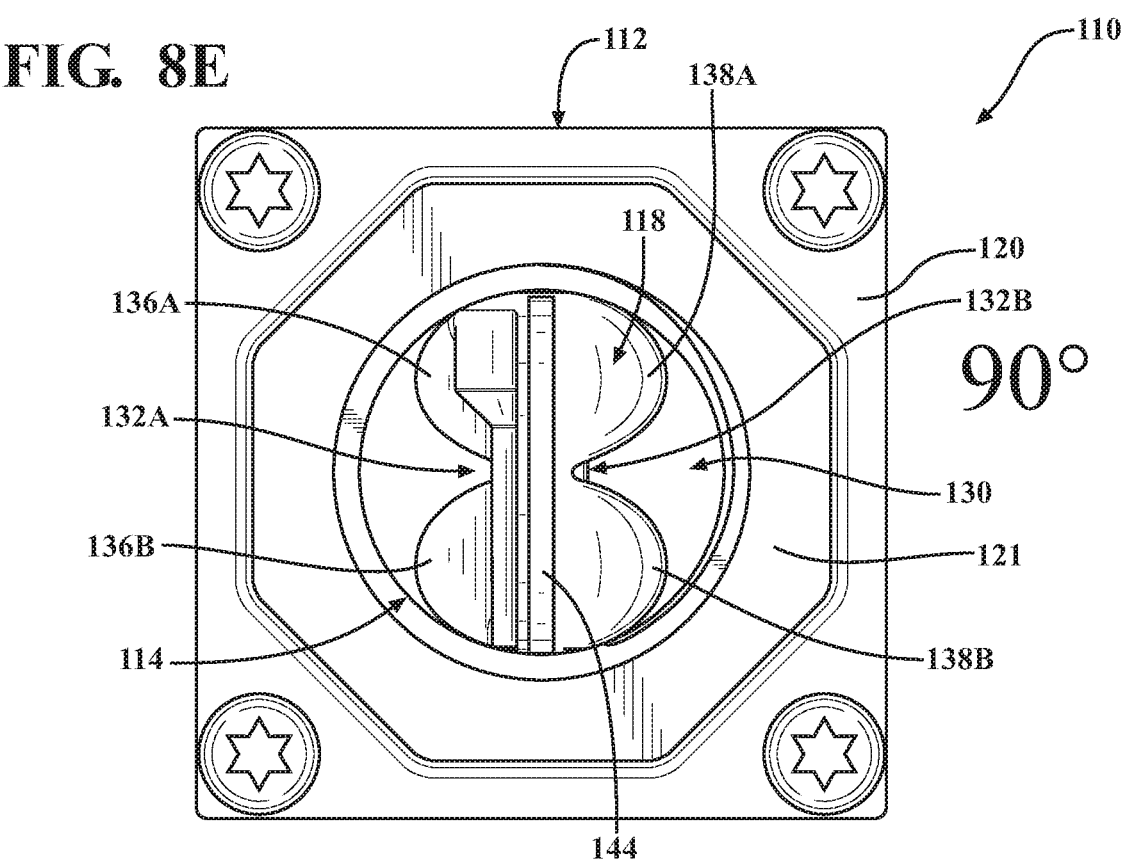
FIG. 8E shows a front view of the multifunction valve of FIG. 6 including the flow control gate in a fourth position.

As illustrated in FIG. 8A, the flow control gate 118 is oriented in a closed position by the force controller 182. Referring to FIG. 8B, the flow control gate 118 is rotated approximately 20 degrees relative to the closed position by the force controller 182. Only a slight or marginal opening is created where the cutout 132A in the second protrusion 138 meets the perimeter or outer edge of the body 119. Referring to FIG. 8C, the flow control gate 118 is rotated approximately 45 degrees relative to the closed position by the force controller 182. A slightly larger opening is created where the cutouts 132A, 132B in the first and second protrusions 136, 138 each meet the perimeter or outer edge of the body 119. The opening has a generally triangular shape. Referring to FIG. 8D, the flow control gate 118 is rotated approximately 60 degrees relative to the closed position by the force controller 182. A larger opening is created where the cutouts 132A, 132B in the first and second protrusions 136, 138 each meet the perimeter or outer edge of the body 119. Referring to FIG. 8E, the flow control gate 118 is rotated approximately 90 degrees relative to the closed position by the force controller 182. Depending on the size and/or shape of the cutouts 132A, 132B and/or the first and second protrusions 136, 138, this may be the largest opening that is created by the flow control gate 118 within the interior chamber 130, producing the maximum fluid flow rate. While various orientations of the flow control gate 118 within the interior chamber 130 of the multifunction valve 110 are illustrated in FIGS. 8A-8E, additional positions and/or orientations are contemplated. For example, the force controller 182 may be configured to step/rotate the control shaft 128, and by extension the flow control gate 118, in two degree increments. Alternatively, the force controller 182 may be configured to step/rotate the control shaft 128, and by extension the flow control gate 118, in five degree increments, ten degree increments, or any other variation thereof.

It should be noted that a generic flow control gate without the protrusions and or cutouts would show a much greater change in the size of the opening created in the interior chamber as the flow control gate was moved from 45 degrees to 60 degrees. This distinction illustrates how the cutouts 132A, 132B in the first and second protrusions 136, 138 provides for the fluid flow rate through the interior chamber 130 to be modified with greater precision. Furthermore, the size and/or shape of cutouts 132A, 132B in the first and second protrusions 136, 138 may allow for a generic step motor with set or standard uniform increments to create a generally linear profile for the flow rate compared to the valve position. By contrast, the step motor of a generic butterfly valve could not achieve a linear profile for the flow rate compared to the valve position using a step motor moving the valve in uniform increments.

Figure 9:
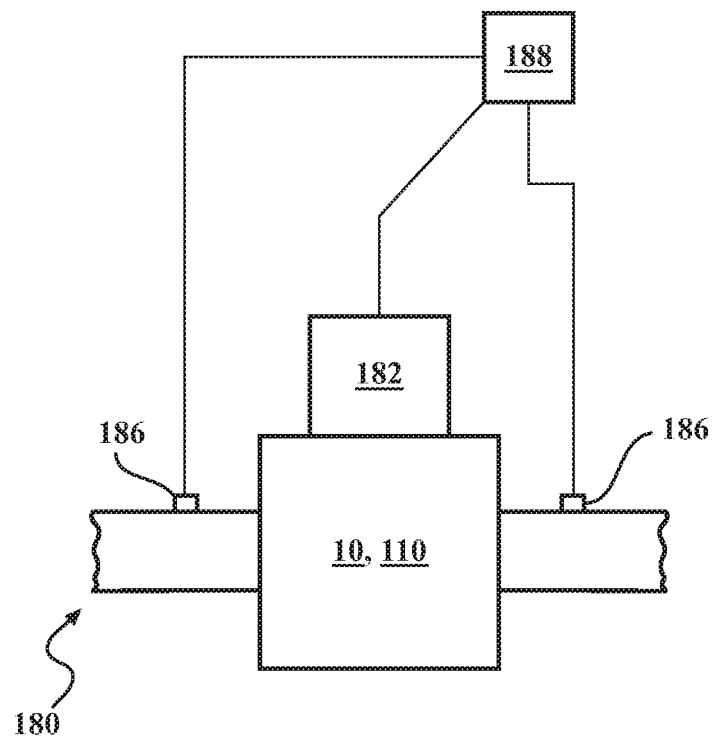
FIG. 9 shows a representative schematic of a portion of a fluid circuit according to an aspect of the present disclosure.

FIG. 9 depicts a schematic representation of a portion of a fluid circuit 180 including one of the multifunction valves 10, 110 described above. A force controller 182, for example a motor, solenoid, or combination thereof, is coupled to the valve body 12, 112 for actuating the multifunction valve 10, 110 to control the fluid flow rate through the fluid circuit 180. One or more sensors 184 and 186 may be provided in the fluid circuit upstream and/or downstream of the multifunction valve 10, 110. Such sensors 184, 186 may be selected to measure a characteristic of the fluid flow, such as flow rate, temperature, pressure, viscosity or other physical attribute. Alternatively, a secondary characteristic, or effect, resulting from the fluid flow may be measured. For example, measuring a temperature rise in a combustion process chamber (not shown) may be directly related to how much fluid (e.g., fuel) has passed through the multifunction valve 10, 110. The sensors 184 and 186, or sensors associated with a combustion process chamber (if present), or other components in a fluid circuit, may be in electronic communication with a system controller 188. The system controller 188 may include a computing device, programmable logic controller, or other system controller capable of receiving sensor signals from the sensors 184 and/or 186, and providing actuation control to the force controller 182.

The system controller 188 is in electronic communication with the force controller 182. The system controller 188 includes control instructions or programming that can generate instructions to direct the force controller 182 to operate the multifunction valve 10, 110 to change the fluid flow rate by rotating the flow control gate 18, 118 or by translating the sealing disk or disks into engagement. In some configurations, the system controller 188 is configured to control the fluid flow rate in response to a signal from one or more sensors 184, 186 that an attribute of the fluid flow has deviated from a set point or set range. In alternative configurations, the system controller 188 may be configured to control the flow rate independent of any sensor signal, for example, according to a predetermined sequence of flow rate modulation over time. In some configurations, the system controller 188 may be integrated with the force controller 182 as a single controller. In other configurations, the system controller 188 and force controller 182 are separate components in electronic communication. Electronic communication between the system controller 188 and the force controller 182, or between the sensors 184 and 186, if present, and the system controller 188 may be achieved through wired communication, wireless communication, or a combination of wired and wireless communication, and including through one or more intermediary devices (not shown).

Figure 10:
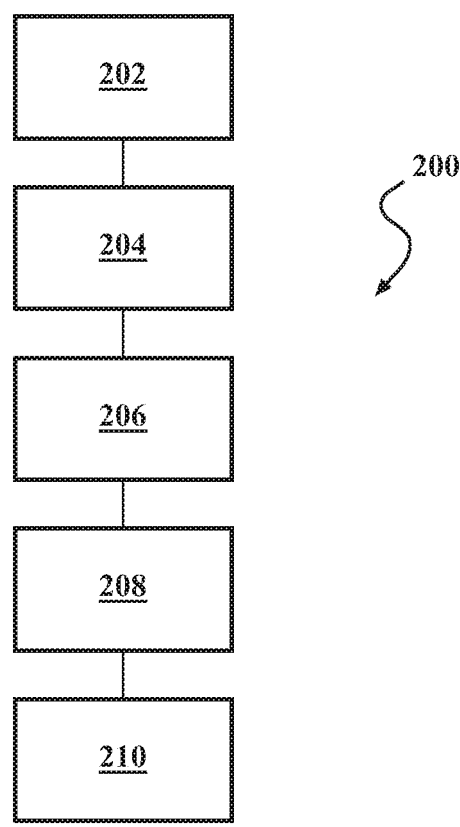
FIG. 10 shows a flow chart illustrating a method of flow control using a multifunction valve.

A method 200 of modulating a fluid flow rate is depicted in FIG. 10. The method may include a first step 202 of sensing, at a sensor, an attribute of fluid flow through a fluid circuit. The sensor generates a sensor signal may be communicated to a system controller as the second step 204. The system controller executes a control operation at step 206, which is responsive to the sensor signal. The execution of the control operation generates a control signal based on previously programmed operation parameters responsive to the sensor signal at step 208 that is communicated to the force controller. Finally, at step 210, the force controller actuates the flow control gate in response to the control signal to adjust the position of the flow control gate position within the multifunction valve in the fluid circuit to modulate the fluid flow rate through the fluid circuit.

Alternative methods of modulating a flow rate may exclude the sensor and sensor signal, the system controller instead generating control signals based on predefined programming or instructions. In a further alternative embodiment, the system controller and the force controller are integrated as a single unit such that the sensors may communicate directly to the force controller, which can respond by directly actuating the force controller to modulate the fluid flow rate. Further alternative methods of control will be readily appreciated considering the multiple configurations described above.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A multifunction valve system including an internal chamber and a force controller, the multifunction valve system comprising:
a flow control member disposed within the internal chamber and rotatably adjustable through an arcuate range of positions between a closed position and an open position, the flow control member comprising:
a member body comprising a first surface and an opposed second surface;
a first axis bisecting the member body to define a first portion and a second portion of each of the first surface and the second surface;
an arcuate-shaped first protrusion extending from a perimeter edge of the first portion of the first surface, the first protrusion comprising a cut-out dividing the first protrusion into first and second portions;
a vertex of the cut-out being positioned at or near the perimeter edge of the member body of the flow control member; and
each of the divided first and second portions having a curved outer edge.

2. The multifunction valve system of claim 1, wherein the flow control member further comprises a coupling feature configured to removably engage the force controller such that the force controller may rotate the flow control member between the closed position and the open position.

3. The multifunction valve system of claim 2, wherein the first axis is positioned to intersect the coupling feature of the member body such that the force controller is configured to rotate the flow control member about the first axis.

4. The multifunction valve system of claim 1, further comprising a groove formed in an outer edge of the member body.

5. The multifunction valve system of claim 4, further comprising a sealing member removably disposed in the groove in the outer edge of the member body, said sealing member configured to engage an interior surface of the internal chamber the flow control member is in the closed position.

6. The multifunction valve system of claim 1, further comprising an arcuate-shaped second protrusion extending from a perimeter edge of the second portion of the second surface, the second protrusion comprising a cut-out dividing the second protrusion into first and second portions.

7. The multifunction valve system of claim 1, wherein the cut-out in the first protrusion is configured to provide a constant gain as the flow control member is moved between the closed position and the open position in uniform increments.

8. The multifunction valve system of claim 1, wherein the cut-out in the first protrusion is configured to provide a linear relationship of flow through the multifunction valve system relative to the travel of the flow control member as the flow control member is moved between the closed position and the open position in uniform increments.

9. The multifunction valve system of claim 1, wherein the cut-out in the first protrusion comprises a V-shaped cut-out when viewing the first surface from an orthogonal position.

10. The multifunction valve system of claim 1, wherein the cut-out in the first protrusion defines a V-shaped cut-out from the first surface.

11. The multifunction valve system of claim 1, wherein the cut-out of the first protrusion defining the first and second portions of the first protrusion comprises a convex-shaped cut-out when viewing the first surface from an orthogonal position.

12. A multifunction valve system comprising:
a valve body defining an inlet in fluid communication with an outlet, the valve body further defining an interior chamber disposed in a fluid flow pathway between the inlet and the outlet;
a control shaft disposed within the interior chamber and coupled to the valve body for rotational movement relative thereto;
a flow control member disposed within the interior chamber and rotatably adjustable through an arcuate range of positions between a closed position and an open position, the flow control member comprising:
a member body comprising a first surface and an opposed second surface;
a coupling feature defined in the member body and configured to receive a portion of the control shaft and to couple the member body to the control shaft for movement therewith;
a first axis bisecting the first surface and the second surface of the member body to define a first portion and a second portion of each of the first and the second surfaces; and
an arcuate-shaped first protrusion extending from a perimeter edge of the first portion of the first surface, the first protrusion comprising a cut-out dividing the first protrusion into first and second portions;
a vertex of the cut-out being positioned at or near the perimeter of the member body of the flow control member; and
each of the divided first and second portions having a curved outer edge; and
a first force controller configured to engage the control shaft to provide rotational motion of the flow control member to move the flow control member between the closed position and the open position.

13. The multifunction valve system of claim 12, further comprising a first attachment feature and a second attachment feature disposed adjacent to the inlet and the outlet, respectively, of the valve body.

14. The multifunction valve system of claim 12, further comprising an arcuate-shaped second protrusion extending from a perimeter edge of the second portion of the second surface, the second protrusion comprising a cut-out dividing the second protrusion into first and second portions.

15. The multifunction valve system of claim 12, further comprising a groove formed in an outer edge of the member body; and
a sealing member removably disposed in the groove in the outer edge of the member body, the sealing member configured to engage an interior surface of the interior chamber of the valve body when the flow control member is in the closed position.

16. The multifunction valve system of claim 12, further comprising a system controller in electronic communication with the first force controller, the system controller configured to generate instructions to direct the first force controller to rotate the flow control member to change the fluid flow rate through the valve body.

17. The multifunction valve system of claim 16, further comprising a sensor configured to measure at least one flow characteristic chosen from: a flow rate, a temperature, a pressure, and a viscosity; and wherein the sensor is configured to generate a signal based on the measured at least one flow characteristic.

18. The multifunction valve system of claim 17, wherein the system controller comprises a computing device configured to receive the signal from the sensor and provide an actuation control signal to the first force controller based, at least in part, on the signal from the sensor.

19. The multifunction valve system of claim 17, wherein the sensor is configured to measure the flow rate and generate the signal based on the measured flow rate; and
wherein the system controller is configured to control the flow rate of fluid through the valve body in response to the signal from the sensor that an attribute of the fluid flow has deviated from a set point or set range.

20. A method of operating a multifunction valve system including a flow control member rotatably adjustable through an arcuate range of positions between a closed position and an open position, the flow control member comprising a member body having a first surface and an opposed second surface, a first axis bisecting the flow control member to define a first portion and a second portion, and an arcuate-shaped first protrusion extending from a perimeter edge of the first portion of the first surface wherein the first protrusion comprises a cut-out having a vertex positioned at or near the perimeter edge of the member body of the flow control member, the cut-out dividing the first protrusion into a first and second portion on opposing sides of the vertex, the method comprising:
providing a force controller configured to engage the flow control member to provide rotational motion of the flow control member in uniform increments as the flow control member is moved between the closed position and the open position to control a flow rate of fluid through the multifunction valve system;
providing a system controller in electronic communication with the force controller, the system controller configured to direct the force controller to rotate the flow control member to change the flow rate; and
manipulating the flow control member in uniform increments using the system controller to provide a constant gain for the multifunction valve system based on the flow rate relative to the position of the flow control member.

* * * * *